Nov. 21, 1933.  A. J. INGALLS  1,935,716

EGG GRADING AND CANDLING DEVICE

Filed Aug. 21, 1931

Inventor
Arnold Jackson Ingalls.

Patented Nov. 21, 1933

1,935,716

UNITED STATES PATENT OFFICE 1,935,716

EGG GRADING AND CANDLING DEVICE

Arnold Jackson Ingalls, Lynn, Mass.

Application August 21, 1931. Serial No. 558,523

1 Claim. (Cl. 99—6)

The invention relates to improvements in determining the weight and condition of an egg in which a weighing scale operates in conjunction with a candling lamp; and the objects of the improvements are; first, to accomplish the two operations of grading and candling at one time; second, to provide manually operated electrical contacts to control the candling lamp.

Figure 1:
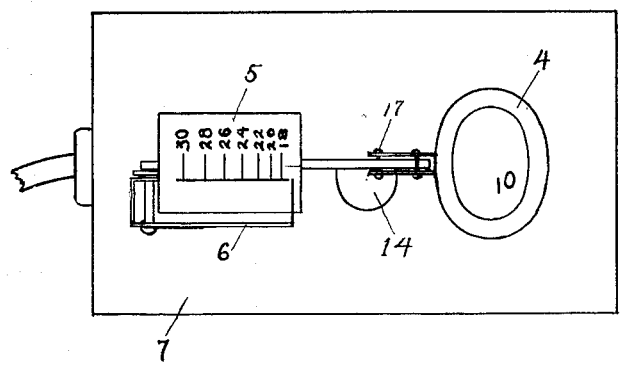
Figure 2:
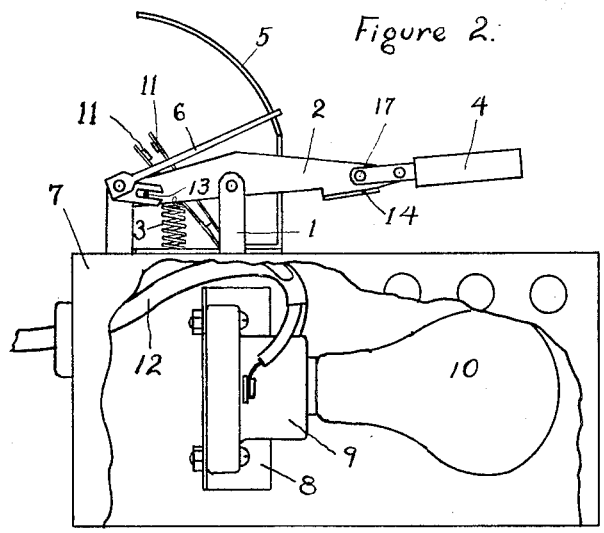

One form of the invention is illustrated in the accompanying drawing in which Figure 1 is a plan view of the entire device; and Figure 2 is a vertical view of the entire device with a portion of the box 7 cut away.

The base 1, the arm 2, the spring 3, the rubber ring 4, the scale 5, and the pointer 6, constitute the grading device.

The box 7, the bracket 8, the socket 9, the lamp 10, the electrical contacts 11—11, and the lamp cord 12, constitute the candling device.

In operating the device an egg is placed in the oval rubber ring 4, the weight of the egg acting against the coil spring 3, with the consequent movement of the arm 2 being transmitted to the pointer 6 by means of the pin 13, said pointer indicating the weight of the egg on the scale 5. (The pin 13 is permanently fastened to the arm 2 at right angles thereto and extends on both sides therefrom.) The projecting tab 14 is then pressed downward, thereby moving the ring 4 toward and against the box 7, where, due to being pivoted at the pin 17 said ring assumes a horizontal position directly over the candling hole, through which, it is illuminated by the lamp 10. The downward movement of the ring 4, also, causes the pin 13 to press together the electrical contacts 11—11, thereby closing the electrical circuit to the candling lamp 10. At this time the egg is candled.

I am aware that separate devices for grading eggs and separate devices for candling eggs have long been in use. I, therefor, make no claim on the separate devices. I am, also, aware that there are candling devices that utilize the weight of an egg to light the candling lamp. I, therefore, do not claim a candling lamp that is lit by the weight of an egg; but, I claim:

An egg grading and candling device comprising a box having a closure for the top with an opening therein, an electric lamp beneath the opening, a lever pivoted intermediate its ends above the top closure, one end of the lever being provided with a ring to support an egg for weighing and candling and arranged when said end of the lever is depressed to bring the egg into candling position close to and immediately above the opening in the top closure, a scale, an indicator cooperating therewith to indicate the weight of the egg, connections between the other end of the lever and the indicator for actuating the latter when the lever moves upon its pivot, a spring for counter-balancing the weight of the egg on the pivoted lever and normally holding the lever in weighing position with the egg raised above the opening in the top closure, an electric switch for the lamp, means for actuating the switch by the movement of the pivoted lever, said means being inoperative while the lever is in weighing position and becoming operative to cause the switch to light the lamp when the lever is actuated manually by the operator to bring the egg into candling position.

ARNOLD JACKSON INGALLS.